(12) United States Patent
Lin

(10) Patent No.: US 7,576,980 B2
(45) Date of Patent: Aug. 18, 2009

(54) STYLUS REMOVAL MECHANISM

(75) Inventor: Chun-Jen Lin, Tu-Cheng (TW)

(73) Assignee: FIH (Hong Kong) Limited, Kowloon (HK)

( * ) Notice: Subject to any disclaimer, the term of this patent is extended or adjusted under 35 U.S.C. 154(b) by 648 days.

(21) Appl. No.: 11/298,873

(22) Filed: Dec. 9, 2005

(65) Prior Publication Data

US 2006/0126287 A1   Jun. 15, 2006

(30) Foreign Application Priority Data

Dec. 10, 2004   (TW) .............................. 93219879 U

(51) Int. Cl.
*H05K 5/00* (2006.01)
*H05K 7/00* (2006.01)
(52) U.S. Cl. ............................ 361/679.56; 361/679.55; 361/679.58
(58) Field of Classification Search ................. 361/679, 361/683, 684, 685, 686, 679.4, 679.55, 679.56, 361/679.58
See application file for complete search history.

(56) References Cited

U.S. PATENT DOCUMENTS

| 4,792,165 | A | * | 12/1988 | Nishimura | ................. | 292/19 |
|---|---|---|---|---|---|---|
| 5,180,891 | A | * | 1/1993 | Trumbo | .................. | 178/19.01 |
| 5,498,039 | A | * | 3/1996 | Bivens | ...................... | 292/145 |
| 5,575,669 | A | * | 11/1996 | Lin et al. | .................... | 439/157 |
| 5,971,777 | A | * | 10/1999 | Garside | ...................... | 439/131 |
| 6,113,403 | A | * | 9/2000 | Oguchi | ...................... | 439/159 |
| 6,330,151 | B1 | * | 12/2001 | Bates, III | .................... | 361/686 |
| 6,332,791 | B1 | * | 12/2001 | Wang et al. | ................. | 439/159 |
| 6,344,968 | B2 | * | 2/2002 | Kim et al. | ................... | 361/681 |
| 6,554,627 | B1 | * | 4/2003 | Chen | ......................... | 439/159 |
| 6,618,259 | B1 | * | 9/2003 | Hood et al. | ................. | 361/740 |
| 6,739,890 | B2 | * | 5/2004 | Hirata et al. | ................ | 439/159 |
| 6,875,033 | B2 | * | 4/2005 | Sato et al. | ................... | 439/159 |
| 6,934,151 | B2 | * | 8/2005 | Nakano et al. | .............. | 361/686 |

* cited by examiner

*Primary Examiner*—Jayprakash N Gandhi
*Assistant Examiner*—Quinn Hunter
(74) *Attorney, Agent, or Firm*—Steven M. Reiss

(57) ABSTRACT

A stylus removal mechanism (100), used in portable electronic devices, includes a main body (10), having a latching hole (1121) defined therein, and an elastic device (20). The elastic device is fixed at the main body and includes an elastic member (21), a removal member (22), and a connecting pole (25). The elastic member includes two ends (210) respectively engaging with the removal member and the main body. The removal member has a cam (240) and a conducting groove (24) defined around the cam. The conducting groove has a latching portion (241). The connecting pole includes one end (251), received in the latching hole of the main body, and another end (252) movably received in the conducting groove.

14 Claims, 6 Drawing Sheets

STYLUS REMOVAL MECHANISM

BACKGROUND OF THE INVENTION

1. Field of the Invention

The present invention relates to stylus removal mechanisms and, particularly, to a stylus removal mechanism for use in removing a stylus from portable electronic devices, such as portable computer devices and portable/mobile telephones.

2. Discussion of the Related Art

At present, portable computer devices, such as palm-top computers, hand-held computers, laptop computers, and personal digital assistants (PDAs), have become increasingly popular. Many of these portable computer devices include an electronic stylus or pen which can be utilized by a user to input information into the computer and/or to select menu options or otherwise navigate through the graphical user interfaces of an operating system or the current software application. Some portable telephones also include an electronic stylus or pen that can be utilized by a user to input information.

Currently, the stylus is either clipped to the outer housing of a given portable electronic device or stored inside the housing thereof. Clipping the stylus to the outside of the housing provides convenient access to the stylus but also carries the disadvantage that the stylus can be easily dislodged from the clip by inadvertent contact with objects, such as the inner surfaces of a carrying case or other objects in the carrying case. Storing the stylus inside the housing provides more security to the stylus but suffers from the disadvantage that the user must take additional steps in order to release the stylus from its place of storage. For example, in one case, a user may be required to reach into the housing to grasp the stylus. In another instance, a user may be required to push the pen further into the housing in order to activate a "door lock release" that will push the stylus out of the housing when the user pushes the pen further into the housing. In other alternates, the portable electronic device may include a stylus removal mechanism with a push button is provided outside thereof to facilitate release of the stylus. Such a stylus removal mechanism is convenient for providing a stylus to a user, but the related stylus removal mechanism is commonly complex and not compact.

Therefore, there is a need for a new stylus removal mechanism, which is a simple, compact, and convenient mechanism for providing a stylus to a user in a manner that avoids and overcomes the disadvantages set forth previously.

SUMMARY OF THE INVENTION

The present stylus removal mechanism generally includes a main body, defining a latching hole 1121, and an elastic device. The elastic device is fixed at the main body and includes an elastic member, a removal member, and a connecting pole. The elastic member has two ends engaging with the removal member and the main body, respectively. The removal member has a cam with a conducting groove defined therearound. The conducting groove has a latching portion. The connecting pole includes one end received in the latching hole 1121 of the main body and another end movably received in the conducting groove.

The stylus removal mechanism is simple and convenient for providing a stylus to a user via releasable attachment. In addition, the structure of the stylus removal mechanism is compact.

Other objects, advantages and novel features of the present stylus removal mechanism will become more apparent from the following detailed description when taken in conjunction with the accompanying drawings.

BRIEF DESCRIPTION OF THE DRAWINGS

Many aspects of the stylus removal mechanism can be better understood with reference to the following drawings. The components in the drawings are not necessarily to scale, the emphasis instead being placed upon clearly illustrating the principles of the present stylus removal mechanism. Moreover, in the drawings, like reference numerals designate corresponding parts throughout the several views.

DETAILED DESCRIPTION OF THE EMBODIMENTS

Figure 1:
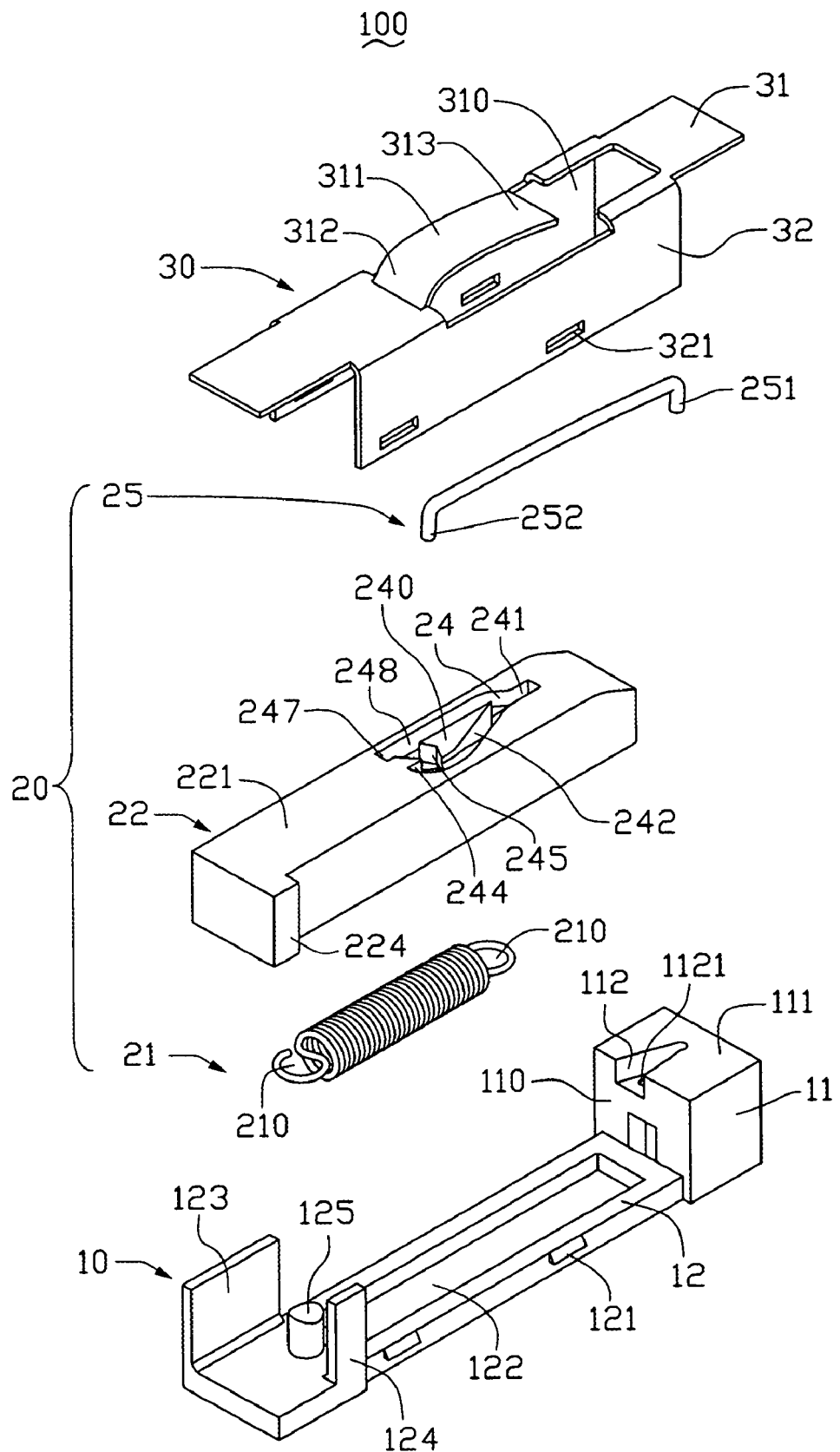
FIG. 1 is an exploded, isometric view of the stylus removal mechanism, in accordance with a preferred embodiment.
Figure 2:
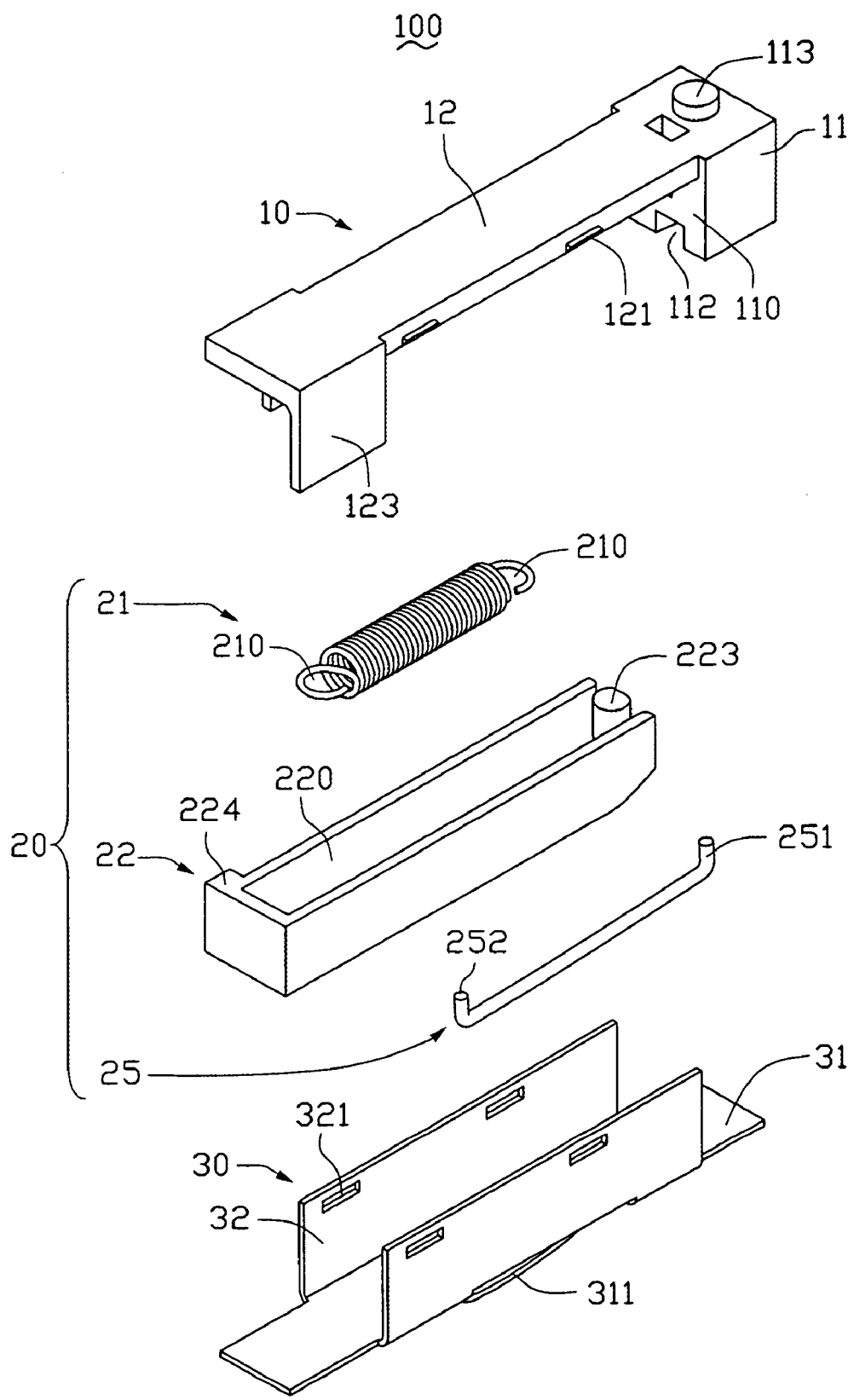
FIG. 2 is similar to FIG. 1, but viewed from another direction.

Referring now to FIG. 1 and FIG. 2, in a preferred embodiment, the stylus removal mechanism 100 includes a main body 10, an elastic device 20, and a cover 30. The main body 10 engages with the cover 30 to define a cavity configured for receiving the elastic device 20 therein.

The main body 10 includes a base holder 11 and a base board 12. The base holder 11 has a side wall 110 and a top wall 111 and further defines a latching groove 112 (i.e., a grooved section or portion that is configured for acting as a latch), which is a fan-shaped groove connecting the side wall 110 and the top wall 111. A latching hole 1121 is defined in the bottom of the latching groove 112. A protruding portion 113 is formed at the wall opposite to top wall 111 of the base holder 11. The protruding portion 113 is used for fixing the stylus removal mechanism 100 to a portable electronic device 300 (shown in phantom in FIG. 10), and the portable device 300 has a concave portion (not shown) configured for engaging with the protruding portion 113. The base board 12 is a rectangular board with one end connecting to the side wall 110, and the width of the base board 12 being smaller than that of the side wall 110. The base board 12 has a side board 123 and a block board 124 at the two sides of the end opposite to the base holder 11. A latching pole 125 protrudes from the base board 12 and is situated between the side board 123 and block board 124. The base board 12 also has a chamber 122 defined therein between the base holder 11 and the latching pole 125. A plurality of wedge-shaped ridges 121 protrudes from two sides of the base board 12, between the base holder 11 and the latching pole 125.

The elastic device 20 is attached to the main body 10 and incorporates an elastic member 21, a removal member 22, and a connecting pole 25.

The elastic member 21 is a two-ended spring with a hook 210 at each respective end thereof.

Figure 3:
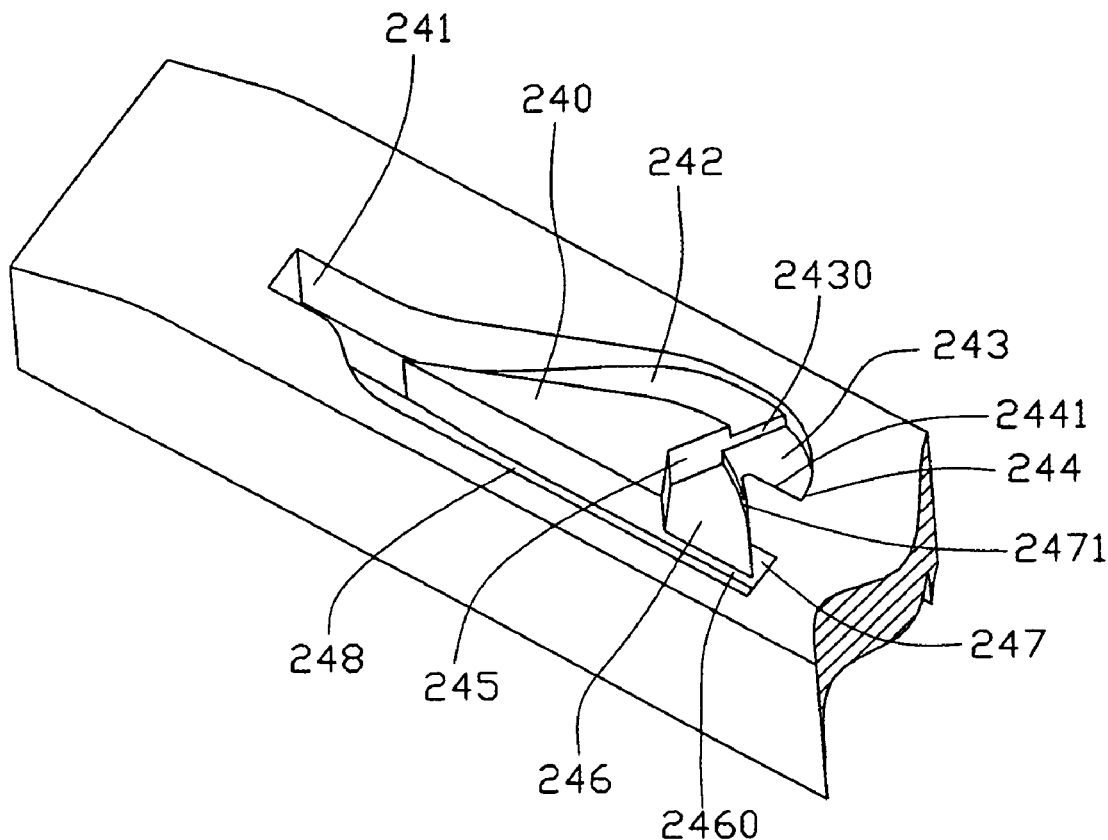
FIG. 3 is an schematic view of the conducting groove of FIG. 1.
Figure 4:
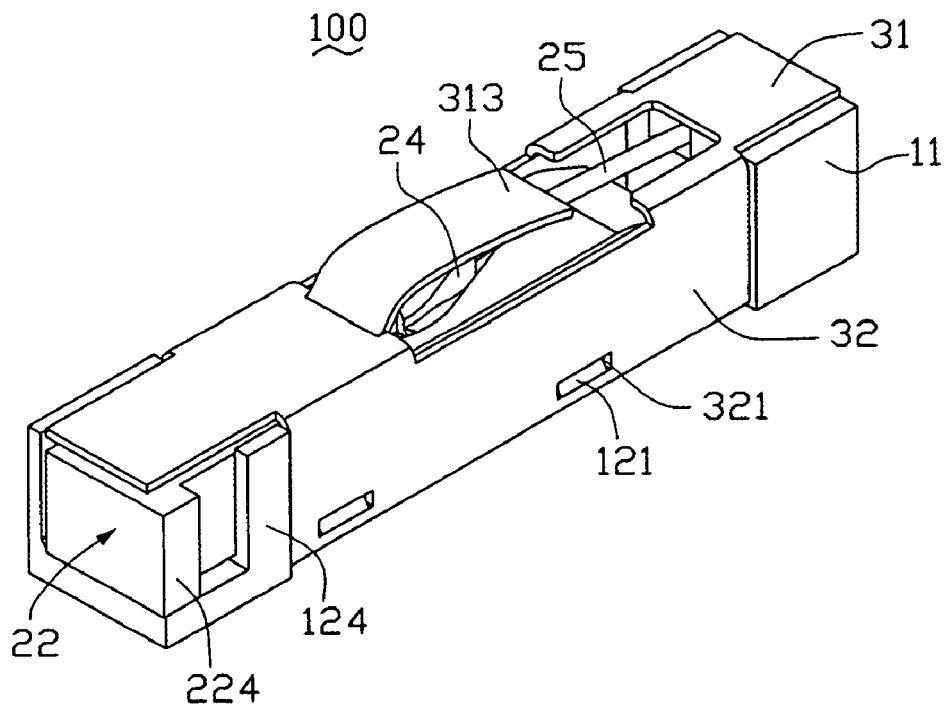
FIG. 4 is an assembled view of the stylus removal mechanism, in accordance with the preferred embodiment shown in FIGS. 1 and 2.
Figure 5:
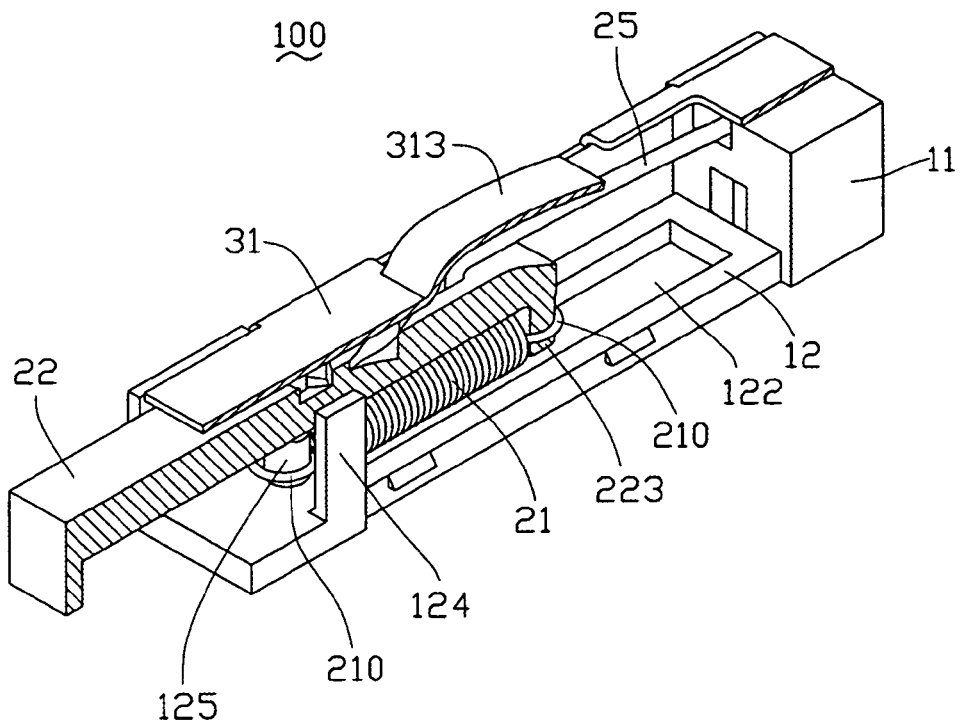
FIG. 5 is a cross-sectional view of the stylus removal mechanism, in accordance with the preferred embodiment shown in FIG. 4.

Referring to FIGS. 1-3, the removal member 22 is an empty housing that has an opening 220 therein and that further includes a top board 221. The length of the opening 220 is larger than that of the elastic member 21. A pole 223 (best seen in FIGS. 2 and 5) protrudes from the top board 221 at one end of the removal member 22 and extends towards the opening 220 of the removal member 22. The top board 221 defines a conducting groove 24, and a cam 240 associated with the top board 221 is surrounded by the conducting groove 24. The conducting groove 24 includes a handle portion 241, a first conducting channel 242, a first top end 244, a latching portion 245, a second top end 247, and a second conducting channel 248. The first conducting channel 242 is a part of the conducting groove 24, connecting from the handle portion 241 to the first top end 244. A first step portion 243 is formed next to the first top end 244 by a hollowed part of the bottom of the conducting groove 24.

A first step surface 2430 is a vertical surface, connecting the first conducting channel 242 and the first step portion 243. A first sidepiece 2441 and a second sidepiece 2471 are formed between the first top end 244 and the second top end 247. The first sidepiece 2441 is next to the first top end 244, and the second sidepiece 2471 is next to the second top end 247. A second step portion 246 is by a hollowed part of the bottom of the conducting groove 24 next to the second sidepiece 2471. The second conducting channel 248 is the part of the conducting groove 24, connecting from the second top end 247 to the handle portion 241. A second step surface 2460 is a vertical surface connecting the second conducting channel 248 and the second step portion 246. The surface of the second step portion 246 is higher than the surface of the conducting channel 248. A block portion 224 protrudes from sidewall at the end opposite to the end with the pole 223 of the removal member 22.

The connecting pole 25 has a first hook 251 at one end thereof and a second hook 252 at an opposite end thereof.

The cover 30 includes a top plate 31 and two side plates 32 protruding from the top plate 31. The top plate 31 has an opening 310 defined therein, and a bent elastic piece 311 protrudes from one end of the opening 310. The elastic piece 311 has a base portion 312 connecting with the end of the opening 310 and an elastic portion 313. Each of the side plates 32 has a plurality of holding holes 321 configured for engaging with the ridges 121 of the base board 12.

Referring to FIGS. 1-5, in assembly, firstly, the elastic member 21 is put in the chamber 122 of the main body 10, with one hook 210 latched by the latching pole 125. Then, the removal member 22 is fastened to the base board 12 with the opening 310 of the removal member 22 being directed towards the base board 12. The block portion 224 of the removal member 22 is mounted on the same side of the block board 124. Half of the elastic member 21 is received in the opening 220 with the other hook 210 fixed by the pole 223. Secondly, the first hook 251 of the connecting pole 25 is received in the latching groove 112, and the connecting pole 25 is rotated in the latching groove 112. The second hook 252 is received in the handle portion 241 of the conducting groove 24. Finally, the cover 30 is fixed on the main body 10, so that the holding holes 321 can engage with the ridges 121 and the elastic portion 313 can press the connecting pole 25. Then, the second hook 252 of the connecting pole 25 can always resist the surface of the conducting groove 24. In that way, the stylus removal mechanism 100 is assembled, shown in FIG. 4.

In use, the stylus removal mechanism 100 is mounted in portable electronic devices such as portable computer devices or mobile/cellular telephones. The operation of the present stylus removal mechanism 100 will be described with reference to FIGS. 5-10.

Figure 6:
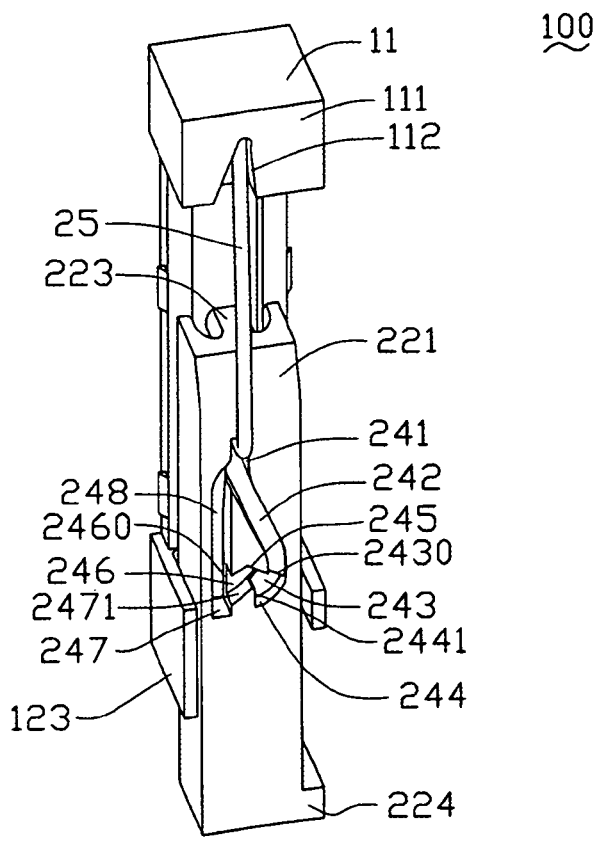
FIG. 6 is an schematic view of the stylus removal mechanism in an original state, the cover not shown, in accordance with the preferred embodiment shown in FIGS. 1 and 2.
Figure 7:
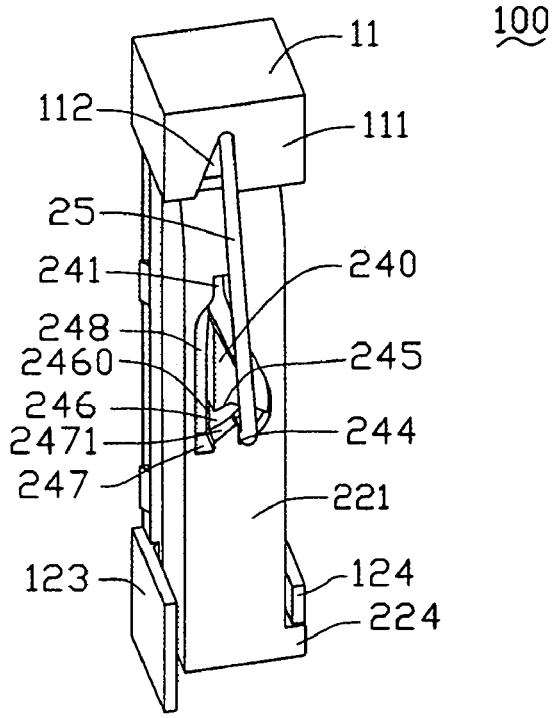
FIG. 7 is similar to FIG. 5, but showing in a transition state, the cover not shown.
Figure 8:
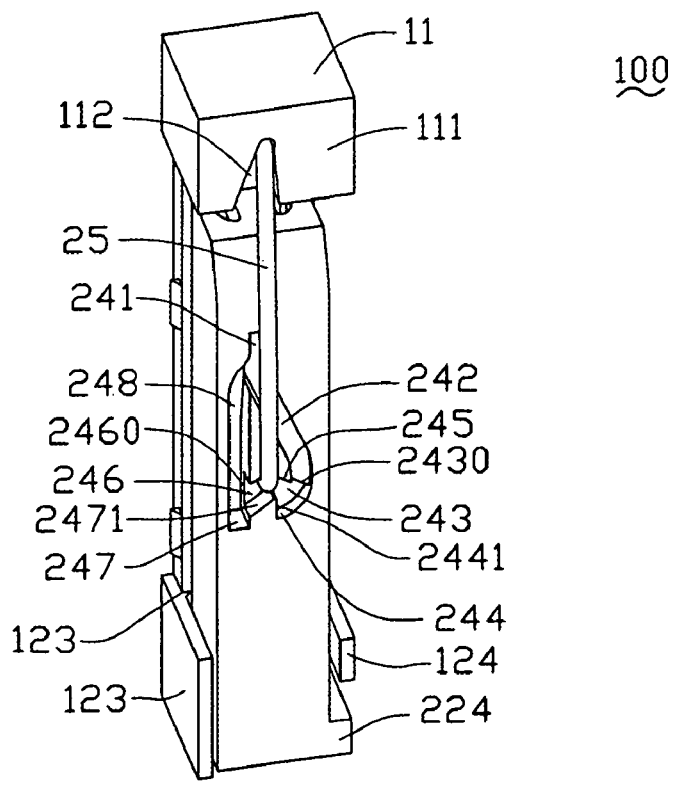
FIG. 8 is similar to FIG. 5, but showing in a latching state, the cover not shown.
Figure 9:
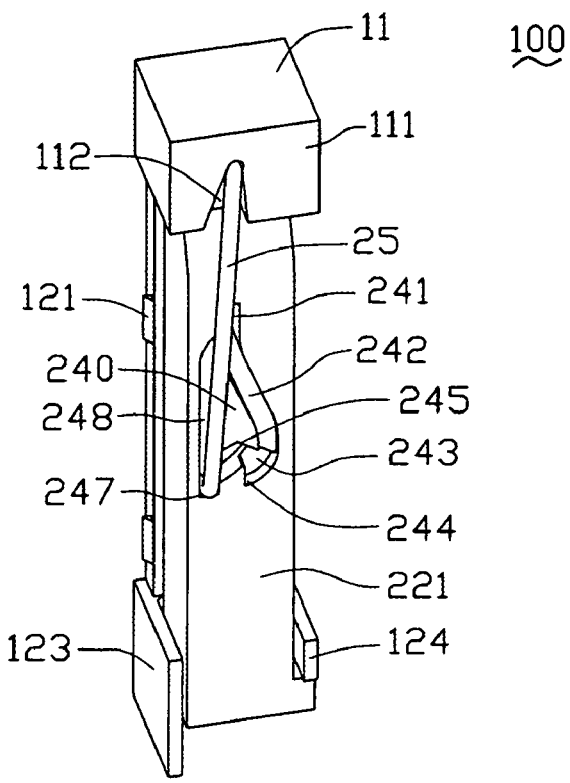
FIG. 9 is similar to FIG. 5, but showing in another transition state, the cover not shown.
Figure 10:
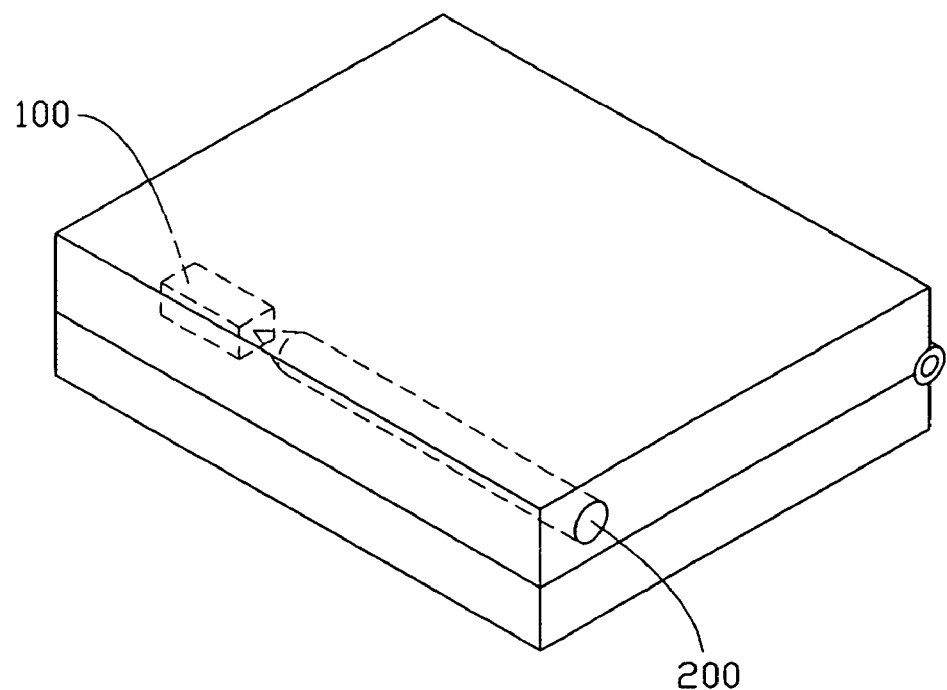
FIG. 10 is an schematic view of a portable electronic device using the stylus removal mechanism.

Referring now to FIG. 1, FIG. 6 and FIG. 10, when a stylus 200 is not received in the portable electronic device 300, the second hook 252 of the connecting pole 25 resists the handle portion 241 of the conducting groove 24, and the elastic member 21 remains in an original state. The end with the block portion 224 of the removal member 22 extends out of the base board 12 and the top plate 31.

When the stylus 200 needs to be received in the portable electronic device 300, the stylus 200 is pressed so that the stylus 200 can resist, and the end of the removal member 22 is pressed so that the removal member 22 can be moved towards the base holder 11. The first hook 251 of the connecting pole 25 can not be moved because of being fixed in the latching groove 112, but, then, the second hook 252 of the connecting pole 25 can be moved along the first conducting channel 242 of the conducting groove 24. When the second hook 252 of the connecting pole 25 moves past the first step portion 243 and resists the first top end 244, the removal member 22 reaches an utmost position, shown in FIG. 7. One end of the elastic member 21 is fixed by the latching pole 125, and the other end is moved together with the pole 223 of the removal member 22. Therefore, the elastic member 21 is pulled and extended to get potential energy. When pressing of the stylus is stopped, the removal member 22 is moved back (i.e., returns) to the original position for release of the potential energy of the elastic member 21. Concurrently, the second hook 252 passes the first step surface 2430 and the second step portion 246, then reaches the latching portion 245. Upon reaching the latching portion 245, the removal member 22 is locked temporarily so that the stylus can be received. In this state, the elastic member 21 is caught in a pulled state and has potential energy, shown in FIG. 8.

When the stylus is to be released from the stylus removal mechanism 100, the stylus 200 is again pressed, the stylus 200 thereby forcing the removal member 22 to move towards the base holder 11. Thus, the second hook 252 of the connecting pole 25 can be moved along the second sidepiece 2471, when the second hook 252 passes the second step portion 246. Upon reaching the second top end 247, the removal member 22 stops moving, shown in FIG. 9. Then, pressing of the stylus 200 is stopped, and the removal member 22 is moved back by the potential energy of the elastic member 21. Because the second hook 252 is stopped by the second step portion 246 from moving to the latching portion 245, the second hook 252 can pass the second top end 247 and move to the handle portion 241, shown in FIG. 6. Thus, the stylus 200 is released from the portable electronic device 300.

In an alternate embodiment, the conducting groove 24 is plated with a protecting film (not shown) which can resist abrasion and/or wear.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A stylus removal mechanism configured for use with a stylus of a portable electronic device, the stylus removal mechanism comprising:
   a main body having a latching hole positioned at one end thereof, and having a side board and a block board positioned at another end thereof, the side board and the block board facing each other; and
   an elastic device fixed relative to the main body, the elastic device including an elastic member, a removal member, and a connecting pole, the removal member being positioned between the side board and the block board;
   wherein the elastic member includes two ends engaging with the removal member and the main body, respectively, the removal member having a cam and a conducting groove defined around the cam, the conducting groove including a latching portion, the connecting pole having one end thereof received in the latching hole of the main body and having another end thereof movably received in the conducting groove; wherein the elastic member is a two-ended spring with a hook at each end thereof, and further wherein a latching pole protrudes from a baseboard between the side board and block board, one hook of the spring being fixed to the latching pole.

2. The stylus removal mechanism as claimed in claim 1, wherein the elastic member is a two-ended spring with a hook at each end thereof.

3. The stylus removal mechanism as claimed in claim 1, wherein the stylus removal mechanism further includes a cover engaging with the main body, the cover defines an opening, a bent elastic piece extends from the cover over the opening for pressing the connecting pole.

4. The stylus removal mechanism as claimed in claim 1, wherein the removal member is comprised of a housing with an opening and a top board.

5. The stylus removal mechanism as claimed in claim 4, wherein the length of the opening is larger than that of the elastic member.

6. The stylus removal mechanism as claimed in claim 4, wherein the elastic member is a two-ended spring with a hook at each end thereof, a pole protrudes from the top board towards the direction of the opening, and one hook of the spring is fixed to the pole.

7. The stylus removal mechanism as claimed in claim 6, wherein a block portion protrudes from sidewall at the end of the removal member, and engages with the block board of the main body.

8. The stylus removal mechanism as claimed in claim 7, wherein the main body comprises a base holder, the base holder having a side wall and a top wall, the base holder defining a latching groove, the latching groove being a fan-shaped, grooved section connecting the side wall and the top wall, and the latching hole is defined in the bottom of the latching groove.

9. The stylus removal mechanism as claimed in claim 8, wherein the main body comprises a base board, the base board is a rectangular board with one end thereof connecting to the side wall, and the side board and the block board are positioned at another end of the base board.

10. The stylus removal mechanism as claimed in claim 9, wherein the width of the base board is smaller than that of the side wall.

11. A stylus removal mechanism configured for use with a stylus of a portable electronic device, the stylus removal mechanism comprising:
    a main body having a latching hole defined therein, the main body including a base holder and a base board, the base holder having a side wall and a top wall, the base holder defining a latching groove, the latching groove being a fan-shaped, grooved section connecting the side wall and the top wall, and the latching hole being defined in the bottom of the latching groove, the base holder having a side board and a block board at the end opposite to the base holder, a latching pole protruding from the base board between the side board and block board; and
    an elastic device fixed relative to the main body, the elastic device including an elastic member, a removal member, and a connecting pole, the removal member including a housing with an opening and a top board, the length of the opening being larger than that of the elastic member, the elastic member being a two-ended spring with a hook at each end thereof, a pole protruding from the top board towards the direction of the opening, and one hook of the spring being fixed to the pole of the removal member, another hook of the spring being fixed to the latching pole of the main body, a block portion protruding from sidewall at the end of the removal member, the block portion being opposite to the end with the pole;
    wherein the removal member has a cam and a conducting groove defined around the cam, the conducting groove including a latching portion, the connecting pole having one end thereof received in the latching hole of the main body and having another end thereof movably received in the conducting groove.

12. The stylus removal mechanism as claimed in claim 11, wherein the base board also defines a chamber between the base holder and the latching pole.

13. The stylus removal mechanism as claimed in claim 11, wherein a plurality of wedge-shaped ridges protrudes from two sides of the base board, the ridges being between the base holder and the latching pole.

14. A stylus removal mechanism configured for use with a stylus of a portable electronic device, the stylus removal mechanism comprising:
    a main body having a latching hole positioned at one end thereof, and having a side board and a block board positioned at another end thereof, the side board and the block board facing each other; and
    an elastic device fixed relative to the main body, the elastic device including an elastic member, a removal member and a connecting pole, one end of the elastic member engaging with the removal member, and another end of the elastic member engaging with the main body, positioned between the side board and the block board, the removal member defining a conducting groove, the connecting pole having one end thereof received in the latching hole of the main body and having another end thereof movably received in the conducting groove; wherein a latching pole protrudes from a baseboard between the sideboard and block board, one end of the elastic member being fixed to the latching pole.

* * * * *